United States Patent [19]

Feldner et al.

[11] 3,721,875
[45] March 20, 1973

[54] DUAL CYCLE BLENDER CONTROL MEANS

[75] Inventors: John Edward Feldner; William Joseph Collins, both of Milwaukee, Wis.

[73] Assignee: Oster Corporation, Milwaukee, Wis.

[22] Filed: Oct. 6, 1971

[21] Appl. No.: 186,989

[52] U.S. Cl. .................................. 318/245, 318/443
[51] Int. Cl. ............................................ H02p 7/00
[58] Field of Search......318/244, 245, 248, 252, 346, 318/440, 443, 444, 470, 305

[56] References Cited

UNITED STATES PATENTS

| | | | |
|---|---|---|---|
| 3,678,357 | 7/1972 | Swanke | 318/245 |
| 3,612,969 | 10/1971 | Cockroft | 318/305 |
| 3,581,177 | 5/1971 | Hausknecht | 318/346 |
| 3,596,161 | 7/1971 | Swanke | 318/252 |
| 3,518,448 | 6/1970 | Sprinkle | 318/470 |
| 3,659,171 | 4/1972 | Morgan | 318/443 |

Primary Examiner—Bernard A. Gilheany
Assistant Examiner—Thomas Langer
Attorney—George R. Clark

[57] ABSTRACT

A control means for a blender comprises a cam driven by a timing motor that has a plurality of camming surfaces which control the energization of the blender motor in an intermittent manner. The ON and OFF cycle times of the intermittently operated blender are automatically changed to correspond to the operating speed range of the blender.

10 Claims, 4 Drawing Figures

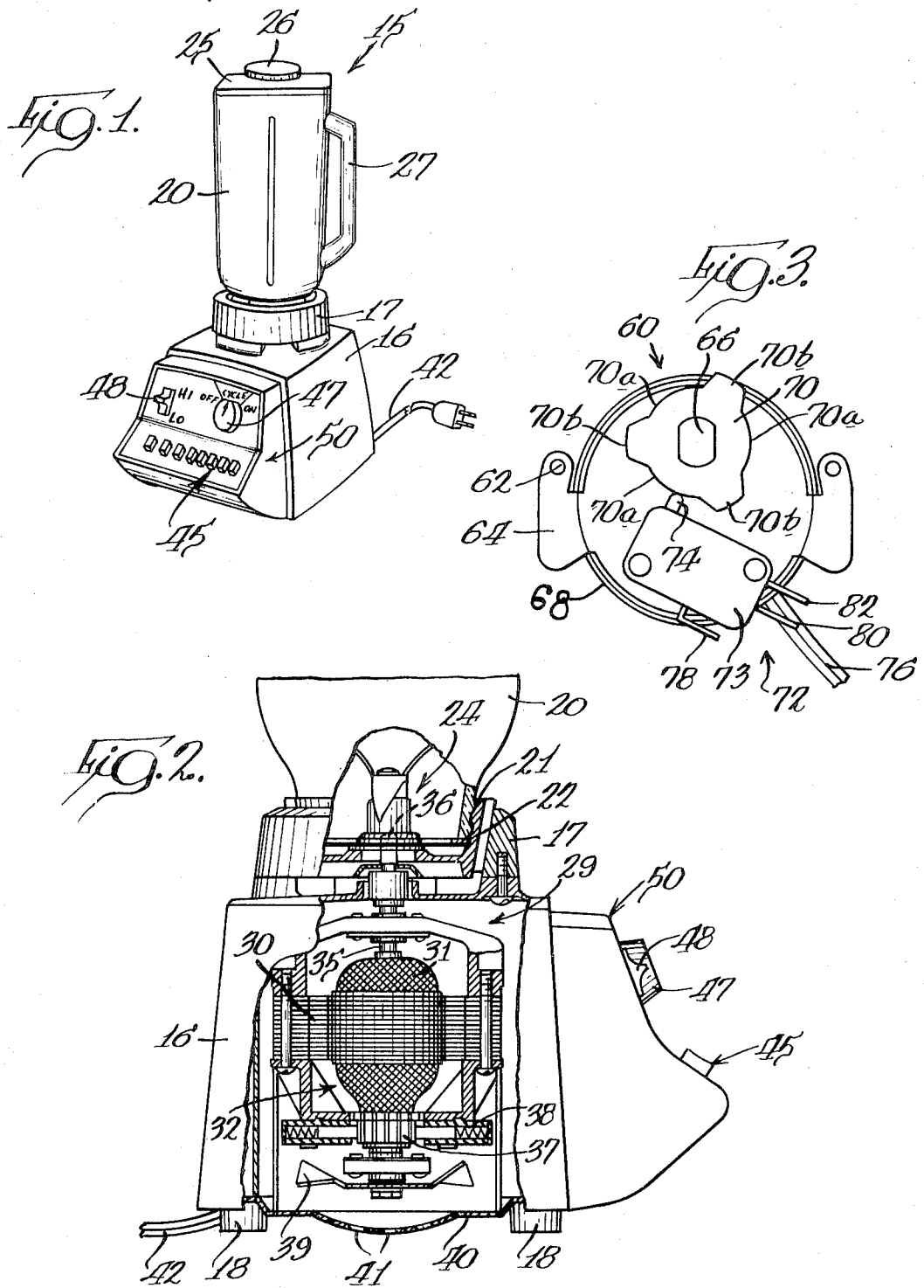

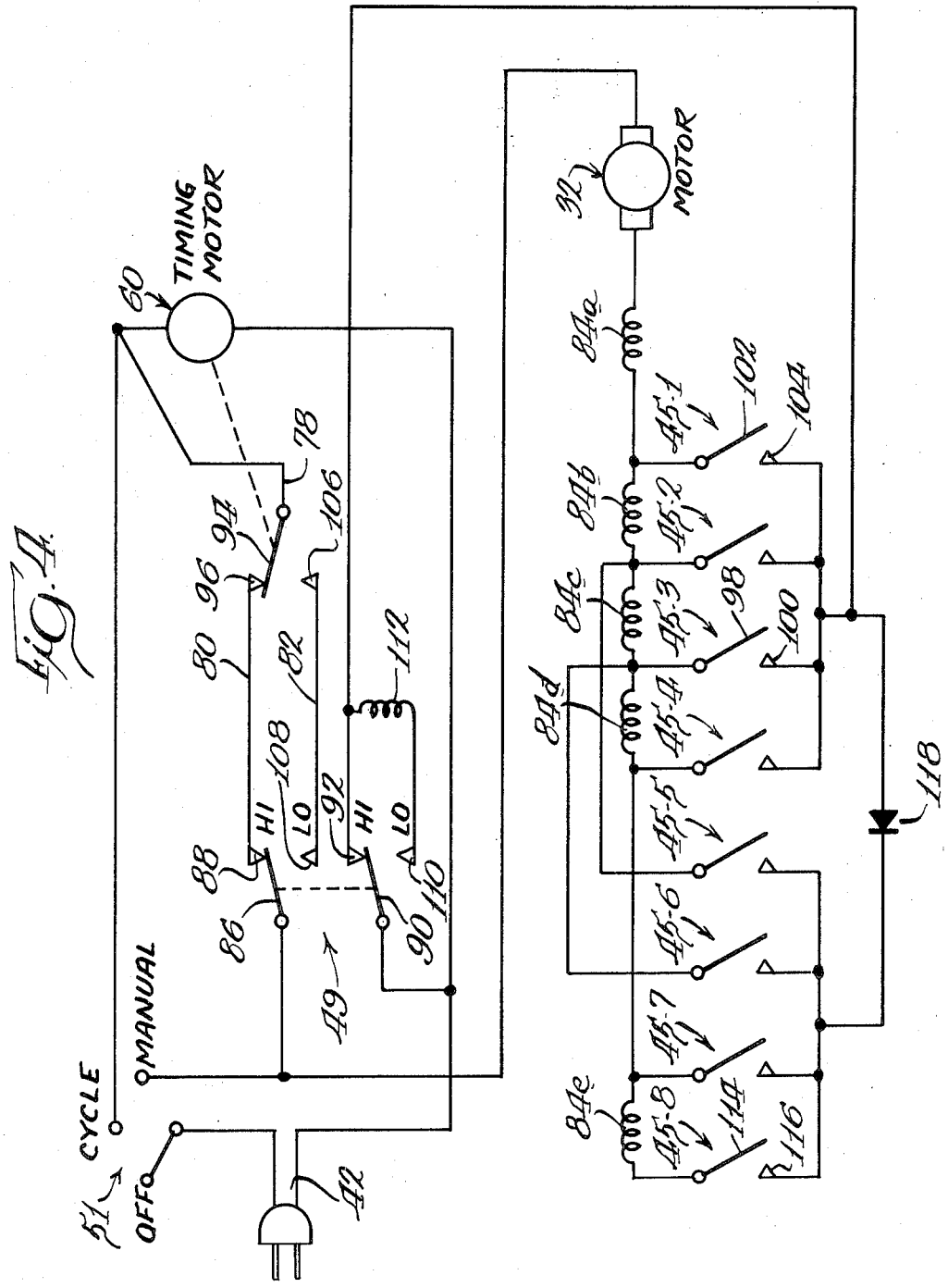

DUAL CYCLE BLENDER CONTROL MEANS

BACKGROUND OF THE INVENTION

In recent years the household blender has become useful for many different operations such as crumbing, chopping, grating, grinding, pureeing, liquefying, blending, whipping and mixing. In order to be useful for these different operations the blender commonly has a plurality of different speeds. When the blender is operated, the liquid or mixture being blended is rotated in the mixing vessel. If the solid particles in the material being mixed do not return to the bottom of the vessel near the rotating blades they will not be efficiently chopped, ground, etc. It has been found that the solid particles will return to the bottom of the vessel if the blender shut off or if the speed of the blender motor is reduced for a period of time. A periodic starting and stopping of the mixer blades causes the mass of the rotating material to fall into the rotating blades and the various blender operations may therefore be performed much more quickly and efficiently.

It has now been further discovered that when a blender has a number of different speeds, the higher speed food processing operations are performed better if the motor is turned on for a longer time than it is turned off during one of the intermittent pulsing cycles and the lower speed food processing operations are performed better if the blender motor is off for a greater period of time than it is on during a cycle.

Accordingly, it is an object of the present invention to provide an improved automatic intermittent control means for a multi-speed blender whereby high speed operations and low speed operations have different on and off times during a cycle of intermittent operation.

It is a further object of the present invention to provide an improved control means for accomplishing automatic intermittent operation of a multi-speed blender wherein the portion of time that the motor of the blender is energized during an intermittent pulsing cycle may be varied in a simple inexpensive manner by utilization of a single timing motor and associated contacts.

Another object of the present invention is to provide an improved method of performing various food preparation operations.

It is an additional object of the present invention to provide an improved multi-range, multi-speed control means for a device utilizing a universal motor.

Further objects and advantages of the present invention will become apparent from the following description and the claims annexed thereto.

DESCRIPTION OF THE DRAWINGS

FIG. 1 is a perspective view of a blender incorporating an embodiment of the present invention.

FIG. 2 is an enlarged elevational fragmentary view of the blender of FIG. 1 with certain portions cut away.

FIG. 3 is a front elevational view of the timing motor and the housing for its associated contacts.

FIG. 4 is a schematic of the blender control circuit.

TECHNICAL DESCRIPTION OF THE INVENTION

Briefly, the present invention if concerned with an automatic intermittent operation control which enables a multi-speed blender to perform various food preparation operations more effectively. The present invention is also concerned with an improved method of preparing food by controlling the intermittent operation of a blending device as a function of the speed of rotation of the blending device.

In order to illustrate the present invention a preferred control circuit for accomplishing the operation of turning the blender ON and OFF is shown and described. It should be understood, however, that the present invention is not limited to intermittent energization and de-energization of the blender motor, but that it also encompasses intermittent change of speed of the blender motor.

A blender in which the present invention is incorporated is shown generally in FIG. 1 by reference numeral 15. The blender unit 15 comprises a base portion 16 which supports a container holder 17. The base is preferably supported on suitable legs or bumpers 18 (FIG. 2). A container 20, which has a threaded bottom, is screwed into corresponding threaded portion 21 of the container holder 17 and the bottom of the container is sealed by the diaphram seal 22. The container holder 17 supports the agitator assembly 24 and the top of the container 20 is closed by a suitable top cover 25 which may have a removable filler cap 26. The container 20 preferably also has an integrally formed handle 27.

A motor mounting assembly 29 is secured in the base 16 to support the field structure 30 and the armature 31 of the motor 32. The armature 31 is mounted on an armature shaft 35 which drives the agitator assembly 24. The field structure 30 of the motor 32 preferably has a tapped field winding, including the windings 84a through 84e and the winding 112, which may be used to achieve speed control of the motor. Alternately, external impedances may be coupled in series with a single field winding in place of the windings 84a through 84e and the winding 112, if desired, although speed control will not be achieved as efficiently with this embodiment.

The armature shaft 35 is coupled to the drive means 36 which may, for example, comprise a square shaft which makes releasable driving engagement with the agitator assembly 24. The motor 32 is provided energy through commutator 37, the conventional spring biased brushes 38 and the power cord 42. A fan 39 is secured to the lower end of the armature shaft 35 to insure proper cooling of the motor 32. A base cover 40 closes the bottom of the base 16 and it is provided with a plurality of openings 41 which permits the circulation of cooling around the motor structure.

In order to enable many different food preparation operations to be performed by a blender it has been found desirable to provide as many as 16 separate operating speeds for the blender. For example, when a blender is used for stirring the blender motor may operate at a relatively low speed. However, for pureeing foods the speed should be increased, and it should become successively higher when the blender is used for chopping, grinding, blending, liquefying or the like.

As illustrated of FIG. 1 of the drawings, the blender of the present embodiment is provided with a plurality of push buttons 45. Eight push buttons are employed to achieve eight blender speeds in each of two speed ranges, or a total of 16 blender speeds. The push buttons 45 are all identical and form no part of the present invention. The push buttons 45 may be constructed as shown in U.S. Pat. No. 3,420,969 issued on Jan. 7, 1969 to M. M. Edwards et al. and assigned to the assignee of the present invention.

Control of the operation of the blender is achieved through the push buttons 45 and the control knobs 47 and 48. The rotatable control knob 47 has three control positions. The left most position is its OFF position, the intermediate position is its intermittent CYCLE position, and the right most position is its ON position. In addition there is a second sliding control knob 48 which controls the speed range of the blender. When the knob 48 is slid to its upper most or HI position the blender is operating at one of its eight higher range speeds, in accordance with the push button 45 that is depressed. When the slide knob 48 is in its lower most or LO position the blender is operating at one of its eight lower speeds, again in accordance with the setting the push buttons 45.

In order to house the push buttons 45 and the associated control means, the cycling control knob 47 and the speed control knob 48, a switch block or shallow housing 50 is formed in the base unit 16. The housing 50 is preferably secured to a partially opened side of the base 16 by screws or other suitable fastening means (not shown). The housing 50 may be molded from a suitable non-conducting plastic such as a general purpose phenolic resin. The construction details of a blender suitable for use with the present invention are described and shown in U.S. Pat. No. 3,518,523, issued June 30, 1970 to L. O. Main, and assigned to the assignee of the present invention.

As described in the above mentioned Edwards and Cockroft patent, the push buttons 45 are constructed so that only one of them may be depressed at any one time to an operative position even though the operator is attempting to actuate two of them simultaneously. It will be appreciated, however, that other push button arrangements, for example binary coded push button control means, may be employed if desired.

The timing motor 60 which controls the cycle time for turning the motor on and off may be secured at any convenient location by screws or other suitable fastening means which can pass through the holes 62 in the outwardly extending ledges 64. The shaft 66 of the timing motor 60 is positioned off-center in the motor housing 68 and a cam 70 is secured to the outer end of the shaft 66. The cam 70 has three curved "low" areas 70a and three curved "high" areas 70b. The electrical contacts associated with the timing motor 60 are housed in the housing 73 of the conventional pin-actuated switch 72. The actuating pin 74 extends from the housing 73 and is biased into engagement with the camming surface of the cam 70 opposite the pin 74. In the position shown in FIG. 3 the actuating pin 74 is in its outward extended position and is in contact with a low surface area 70a. When the actuating pin is in this position an ON or OFF cycle time corresponding to the time that it takes the cam 70 to rotate the surface 70a pass the actuating pin 74 will be established. The actuating pin 74 will next be forced part way into the housing 73 in contact the camming surface of a high area. During the time that this high camming surface is in contact with the actuating pin 74 a shorter ON or OFF cycle time will be established.

The electrical control circuit for the described embodiment is shown in the schematic of FIG. 4. The motor 32 is a universal motor and, as previously mentioned, preferably has a tapped field winding which comprises the windings 84a through 84e and the winding 112. The switches that are activated by the push buttons 45 are shown schematically in FIG. 4 by the switches 45-1 through 45-8. Each of these switches represent a different motor speed in both the high and the lower motor speed ranges. Thus with eight low range motor speeds and eight high range motor speeds a total of sixteen speeds may be selected.

When an operation requiring one of the eight highest speeds of the blender is to be performed the switch 49 is positioned to its HI position by the control knob 48. This allows electrical contact to be made between the moving contact 86 and the stationary contact 88 and also between the moving contact 90 and the stationary contact 92. If the switch 51 is also positioned in its CYCLE position by the knob 47 at this time input power will be supplied through the line cord 42 to energize the timing motor 60. When the timing motor 60 is energized it drives the cam 70. This causes the movable switch contact 94, which is enclosed in the housing 72, to engage the stationary contact 96. Electrical current will then flow through the connector 78, the contacts 94 and 96, the electrical connector 80, the contacts 86 and 88 and through a portion of the field winding of the motor, in accordance with the setting of the push buttons 45. For example, if the push button switch 45-3 were selected the movable contact 98 would engage the stationary contact 100 and current would flow from one side of the power line through the windings 84a, 84b, and 84c, and then through the stationary contact 92 and the movable contact 90 to the other side of the power line. If the push button switch 45-1 were selected instead the movable contact 102 would engage the stationary contact 104 and current would then flow only through the field winding 84a and the motor would rotate at a faster speed since more current would be flowing through its field windings.

If one of the eight lowest motor speeds is desired the switch 48 is positioned to its LO position by movement of the knob 48. The movable contact 86 then engages the stationary contact 108 and the movable contact 90 engages the stationary contact 110. By connecting the movable contact 86 to the stationary contact 108 instead of the stationary contact 88 the times for the ON and OFF cycles of the timing motor are reversed since the motor 32 will then be energized through the path consisting of the electrical connector 78, contacts 94 and 106, the electrical connector 82, contacts 86 and 108 and the appropriate field winding segments 84a through 84e, as selected by the push buttons 45 in the manner previously described. When the movable contact 90 engages the stationary contact 110 the coil 112 is inserted in series with the other field windings of the motor and in this manner the eight lowest blender speeds are obtained since all speeds in the LO speed range will be reduced as a result.

The current return for four lowest speeds of both the HI and the LO speed ranges is through the diode 118. Thus the speeds in both the HI and the LO speed ranges that are controlled by the push button switches 45-5 through 45-8 are achieved by having DC current flow through the field windings of the motor 32 rather than AC current. Therefore, the speed of the universal motor 32 may be reduced for the lower speeds in each range even though the same field windings that are carrying DC current are assorted with a higher motor speed when they are carrying AC current.

While the four fastest speeds in both the HI and the LO speed ranges are achieved by connecting the field windings 84a through 84d in series with the field of the motor the lowest speed in each range is achieved by connecting the field winding 84e in series with the windings 84a–84d through the contacts 114 and 116 of push button switch 45-8. The other three low speeds of each speed range are controlled by the switches 45-7, 45-6 and 45-7 and are achieved by utilization of the windings 84a through 84d.

It has been found that the intermittent operation of the blender of the present invention is extremely effective for performing food processing operations in the high range of motor speeds when the motor is turned on for 2.5 seconds and is turned off for 1.5 seconds. Thus, for the HI speed operations the camming surface 70a of the cam 70 will be in contact with the actuating pin 74 when the switch contact 94 is in contact with the stationary contact 96. For HI speed operation, when a high portion 70b of the cam 70 has its camming surface 70b in contact with the actuating pin 74 the moving contact 94 is positioned so that it contacts the stationary contact 106. This breaks the energization circuit for the motor 32 and the motor 32 will then slow down or come to a stop. Since the circumferential distance of the camming surface 70b is less than the circumferential distance of the camming surface 70a the motor will be energized for a longer period of time than it will be de-energized.

For the low range of motor speeds it has been found that an ON cycle time of 1.5 seconds and an OFF cycle time of 2.5 is more effective. Switching of the switch 49 from its HI position to its LO position reverses the ratio of ON time to OFF time in the manner previously discussed. Thus, the camming surface 70a is associated with OFF time and the camming surface 70b is associated with ON time for the LO speed range.

While a particular embodiment of the present invention has been described it is not intended that the invention be limited thereto since many modifications may be made and it is intended to cover any such modification that falls within the true scope and spirit of the appended claims.

What is claimed is:

1. A motorized device coupled to an alternating source of electrical power comprising a housing, a universal motor supported by said housing and control means comprising a plurality of field windings, rectifier means coupled to said source of electrical power, switch means comprising a first plurality of switches coupled to said windings for selectively connecting selected ones of said windings to said source of electrical power for conduction of alternating current through said selected windings and a second plurality of switches coupled to said windings for selectively connecting selected ones of said same windings to said rectifier means for conduction of direct current through said selected field windings and said rectifier means, said first and second plurality of switches being selectively actuatable so that current will flow through only one of said switches during operation of said device.

2. The motorized device of claim 1 wherein said motorized device is a blender comprising blending means coupled to said motor and further comprising range selection means comprising impedance means and means for selectively coupling said impedance means in series with said field windings in accordance with the desired speed operating range.

3. A method of processing material to be blended comprising the steps of blending said material at a nominal speed and alternately decreasing blending speed to a lower speed and then increasing said blending speed back to said nominal speed in a manner such that said decreasing time period is greater than said increasing time period at blending speeds below a predetermined nominal blending speed and in a manner such that said increasing time period is greater than said decreasing time period at blending speeds above said predetermined nominal blending speed.

4. The method of claim 3 wherein the ratio of said increasing time period to said decreasing time period at blending speeds below said predetermined nominal blending speed is equal to the ratio of said decreasing time period to said increasing time period at blending speeds above said predetermined nominal blending speed.

5. The method of claim 4 wherein said ratio is approximately 3:15.

6. A blender coupled to a source of electrical power comprising a housing, a motor supported by said housing, blending means coupled to said motor, motor speed control means coupled to said motor and constructed to provide motor operation over a plurality of speed ranges and timing means selectively coupleable to said source of power for energization and to said motor speed control means, said timing means comprising means for intermittently deenergizing and energizing said motor in a manner such that the ratio of time that said motor is deenergized to the time that said motor is energized is different for at least two of said selected motor speed ranges.

7. A blender as set forth in claim 6 having a high motor speed operating range and a low speed motor operating range wherein said timing means comprises a timing motor, camming means rotatably coupled to said timing motor, a moving contract coupled to said source of electrical power and operated by said camming means, a first stationary contact and a second stationary contact, said camming means being constructed to engage said moving contact and said first stationary contact for a first predetermined period of time and said moving contact and said stationary contact for a second predetermined period of time; said motor speed control means comprising speed range selection means comprising a plurality of contacts coupled to said motor for energizing said motor through said first stationary contact when said motor is being operated in said high motor speed operating range and through said second stationary contact when said motor is being operated in said low motor speed operating range.

8. A blender as set forth in claim 7 wherein said first predetermined period of time is longer than said second predetermined period of time.

9. A blender as set forth in claim 8 wherein said motor speed control means comprises a plurality of field windings, rectifier means coupled to said source of electrical power, switch means comprising a first plurality of switches coupled to said windings for selectively connecting selected ones of said windings to said source of electrical power for conduction of alternating current through said selected windings and a second plurality of switches coupled to said windings for selectively connecting selected ones of said same windings to said rectifier means for conduction of direct current through said selected field windings and said rectifier means, said first and said second plurality of the switches being selectively actuatable so that current will flow through only one of said switches during operation of said blender.

10. A blender as set forth in claim 9 wherein said speed range selection means comprises an impedance means and contact means for coupling said impedance means in series with said field windings when said blender is to be operated in said low motor speed operating range.

* * * * *